No. 871,562. PATENTED NOV. 19, 1907.
LUCIEN HIPPOLYTE BERNEL, OTHERWISE KNOWN AS BERNEL BOURETTE.
APPARATUS FOR ASCERTAINING THE PROBABILITY OF FROST.
APPLICATION FILED AUG. 10, 1905.

2 SHEETS—SHEET 1.

WITNESSES:

INVENTOR
Lucien Hippolyte Bernel
Otherwise known as Bernel Bourette
BY
ATTORNEYS No. 871,562. PATENTED NOV. 19, 1907.
LUCIEN HIPPOLYTE BERNEL, OTHERWISE KNOWN AS BERNEL BOURETTE.
APPARATUS FOR ASCERTAINING THE PROBABILITY OF FROST
APPLICATION FILED AUG. 10, 1905.

2 SHEETS—SHEET 2.

WITNESSES:
W. M. Avery

INVENTOR
Lucien Hippolyte Bernel
Otherwise Known as Bernel Bourette
BY
ATTORNEYS

UNITED STATES PATENT OFFICE.

LUCIEN HIPPOLYTE BERNEL, OTHERWISE KNOWN AS BERNEL BOURETTE, OF PARIS, FRANCE.

APPARATUS FOR ASCERTAINING THE PROBABILITY OF FROST.

No. 871,562.  Specification of Letters Patent.  Patented Nov. 19, 1907.

Application filed August 10, 1905. Serial No. 273,562.

*To all whom it may concern:*

Be it known that I, LUCIEN HIPPOLYTE BERNEL, otherwise known as BERNEL BOURETTE, a citizen of the Republic of France, residing in the city of Paris, in the Republic of France, have invented a new and useful Apparatus for Ascertaining the Probability of Frost, of which the following is a specification.

The invention is an improvement in apparatus enabling to foresee frost, and consists in certain novel constructions and combinations of parts hereinafter described and claimed.

Figure 1:
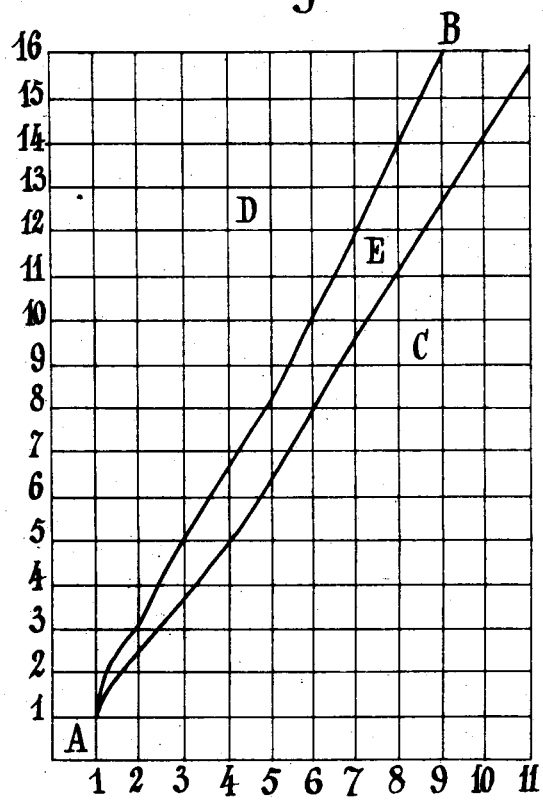
Figures 2, 3:
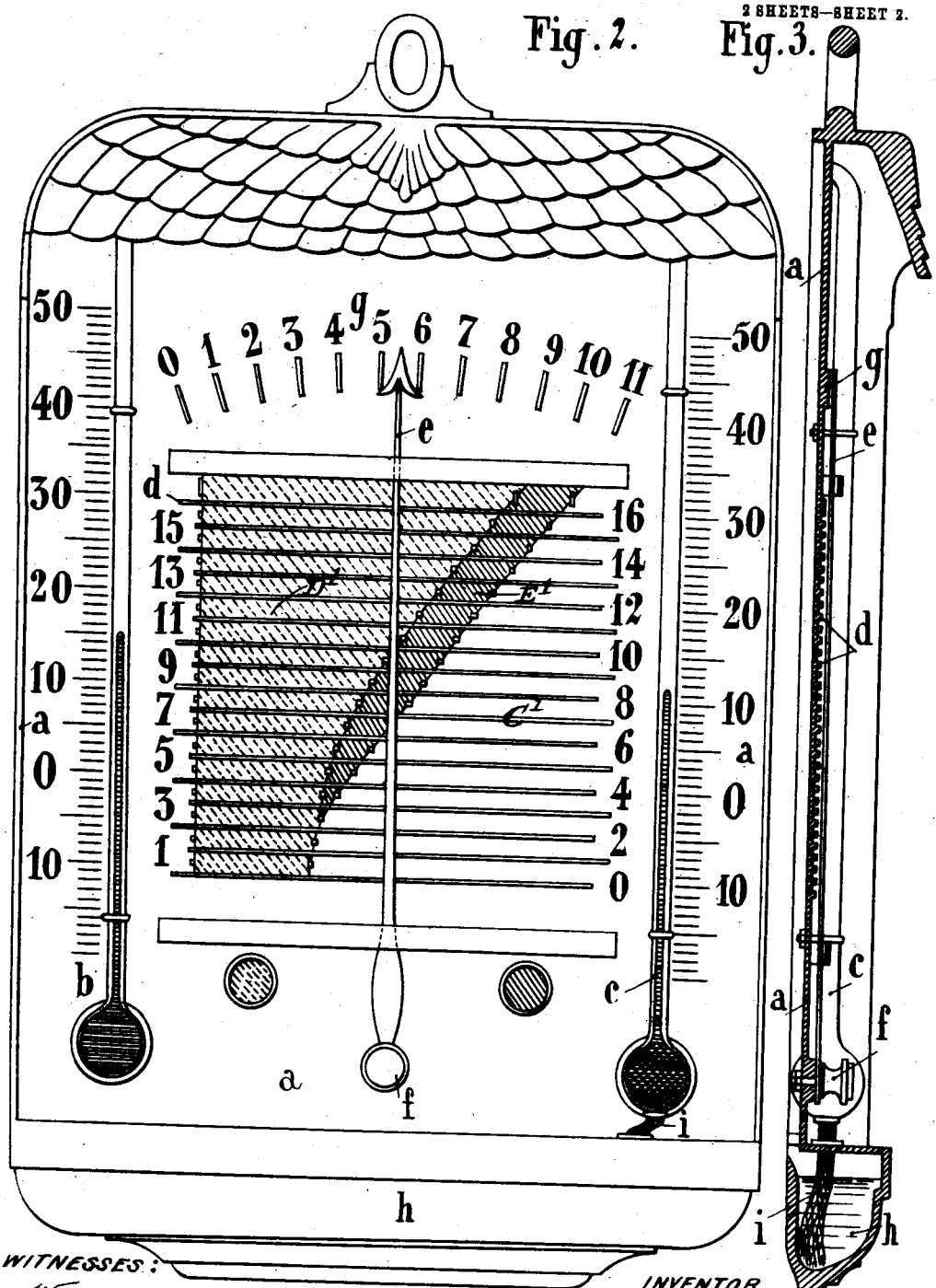

Referring to the drawings forming a part hereof, in which similar characters of reference indicate corresponding parts in all the figures, Figure 1 is a plan view of a theoretical table or chart, read in connection with the apparatus. Fig. 2 is a face view of the apparatus; and Fig. 3 is a longitudinal vertical section through the same.

This apparatus is based upon that principle that frost is due to the nightly cooling when the dew-point is below 0°.

Heretofore, apparatus such as the August's psychrometer composed of two thermometers, the one dry and the other wet, could be used for that purpose but after having read the figures of these thermometers, it was necessary to refer to tables in order to detect the dew-point and to ascertain whether there was any danger of frost. This reading of the tables cannot be effected by everybody. The present device avoids this disadvantage. It comprises besides the two above mentioned thermometers a table which indicates at once and with an easy reading whether it will freeze or not, this apparatus involving the following principle: Supposing a table (Fig. 1) upon which the figures of the dry thermometer are indicated by ordinates and those of the wet thermometer by abscissæ. The indications of the dry thermometer show the temperature of the surrounding atmosphere. For the temperature indicated, the dew point is a temperature depending upon the atmospheric conditions, and which can be estimated from the indications for the wet and dry thermometers. For instance, if the dry thermometer indicates 10° C. and the wet thermometer 9°, the dew point is 7.9°. If the wet thermometer indicates 8°, the dew point is 5.6°, and if the wet thermometer is at 6°, the dew point is at zero. By uniting the points the value of which lies between 0° and 1°, I obtain a curve A—B dividing the table into two zones C and D, the one having the dew-points above and the other below 0°.

In conformity with the principle of the formation of dew, according as the coördinates of the thermometrical figures will meet in the zone C or in the zone D, it will not or it will freeze. Furthermore, in order to take into account, the sudden lowerings of temperature which can take place during the night, it is prudent to provide a dangerous zone E along the curve A B.

Practically, the apparatus is constructed in the following manner: Fig. 2 of the drawing shows the apparatus in face view and Fig. 3 shows it in vertical section made according to the axis. This apparatus is formed of a small board $a$ carrying the two dry and wet thermometers $b$ and $c$ and their graduations, and a table divided by horizontal lines $d$ corresponding to the divisions of the dry thermometer. In front of this table moves a pointer $e$ operated by a knob $f$ the end of which moves over a graduated segment $g$ corresponding to the divisions of the wet thermometer. The table is divided into three zones corresponding to C D E determined as above specified and painted in different colors and designated as C', D' and E'. At the bottom there is water container $h$ in which dips a wick $i$ surrounding the container of the wet thermometer.

For the purpose of consulting the apparatus, the same is hung to a separated pole at about 50 centimeters above the ground, after having filled the container with water containing no lime, rain water or even boiled water. About a quarter of an hour after, an observation can be made. This observation ought to be made at sunset in spring between four and six o'clock p. m. After having read the degree of the wet thermometer, the end of the needle is set over the corresponding figure of the graduated segment $g$, then the horizontal line of the degree of the dry thermometer is ascertained. When the meeting point of the needle and the horizontal lines lies in the zone D', it will freeze; in the zone C' it will not freeze and in the zone E' there will be danger of frost.

The forms, dimensions and details of the apparatus can vary without altering the principle of the invention.

The manner of tracing the line A—B on the diagram (Fig. 1) is as follows. If, for instance, the wet thermometer indicates 9°, the dew point is at 7 9/10°. If the thermometer indicates 8°, the dew point is at 5 6/10°. If the wet thermometer is at 6° the dew point is at zero. When the dew point is above zero, the probabilities are in favor of no frost, but when it is below, the probabilities are in favor of frost. A line drawn on the table through the points which taken together would show conditions indicating that the dew point would be at zero is taken as the mean or as the dividing line between the probability of frost and the probability of no frost. However, since the temperature changes are uncertain, an arbitrary zone is formed including the mean line and a slight distance on each side for the danger zone.

Having thus described my invention, I claim as new and desire to secure by Letters Patent,—

1. An apparatus for indicating the probability of frost, and adapted for use with the wet and dry thermometers of a psychrometer comprising a base having horizontal lines numbered to correspond with the divisions of the dry thermometer, a scale above the horizontal lines numbered to correspond with the divisions of the wet thermometer, and a pointer pivoted to the base below the horizontal lines, the free end of the pointer coöperating with the scale above the horizontal lines, the space covered by the horizontal lines being divided into zones, one of said zones including intersections of the pointer and the horizontal lines corresponding to the divisions of the wet and dry thermometers which occurring together would indicate the certainty of frost, another including intersections showing the probability of frost, and a third including intersections showing the certainty of no frost.

2. An apparatus for indicating the probability of frost, and adapted for use with the wet and dry thermometers of a psychrometer, comprising a base having horizontal lines numbered to correspond with divisions of the dry thermometer, and a scale above the lines indicating divisions of the wet thermometer, and a needle pivoted to the base for coöperating with the scale, the portion of the base having the horizontal lines being divided into zones, said zones including respectively the intersections of the needle and the horizontal lines corresponding to the divisions of the wet and dry thermometers, which occurring together would indicate the certainty of frost, the probability of frost, and the certainty of no frost.

3. An apparatus for indicating the probability of frost, and adapted for coöperation with the dry and wet thermometers of a psychrometer, comprising a table having graduated horizontal lines, a scale above the horizontal lines, a needle pivoted on the base and coöperating with the scale, the table being divided into zones in such a way that if the meeting point of the horizontal lines, the number of which is the one indicated by the dry thermometer, and of the needle, the end of which is on the number of the scale indicated by the wet thermometer, falls in one or the other zones, the apparatus indicates that there will be sure frost, probability or not of frost.

The foregoing specification of my apparatus enabling to foresee the frost signed by me this thirtieth day of June 1905.

LUCIEN HIPPOLYTE BERNEL,
*Otherwise known as Bernel Bourette.*

Witnesses:
HANSON C. COXE,
MAURICE H. PIGNET.